(12) United States Patent
Rioux

(10) Patent No.: US 6,629,549 B2
(45) Date of Patent: Oct. 7, 2003

(54) LATHE ATTACHMENT FOR A PORTABLE BANDSAW MILL

(76) Inventor: Yves Rioux, 98 Chemin Nicholas, Hacheyville, New Brunswick (CA), E8M 1J4

( * ) Notice: Subject to any disclaimer, the term of this patent is extended or adjusted under 35 U.S.C. 154(b) by 46 days.

(21) Appl. No.: 09/957,023

(22) Filed: Sep. 21, 2001

(65) Prior Publication Data

US 2002/0038587 A1 Apr. 4, 2002

(30) Foreign Application Priority Data

Sep. 25, 2000 (CA) ............................................ 2320648

(51) Int. Cl.[7] .............................. B23B 3/00; B23B 3/36; B27C 9/00

(52) U.S. Cl. ........................... 144/378; 82/117; 82/152; 142/1; 142/4; 142/7; 144/35.1; 144/35.2; 144/138; 144/365; 83/409

(58) Field of Search .......................... 82/117, 152, 118, 82/129, 142; 29/26 B, 560; 83/409, 426, 703, 704, 708, 865, 861; 142/1, 4, 7, 40, 47; 144/1.1, 2.1, 35.1, 35.2, 137, 138, 154, 365, 376, 378, 48.4

(56) References Cited

U.S. PATENT DOCUMENTS

| 511,618 A | 12/1893 | Hurteau | |
|---|---|---|---|
| 860,486 A | 7/1907 | King | |
| 1,496,982 A | 6/1924 | Dunham | |
| 2,080,475 A | 5/1937 | Hedgpeth | 144/1 |
| 3,709,622 A | * 1/1973 | Morse | 144/48.7 |
| 4,161,974 A | 7/1979 | Patterson | 144/287 |
| 4,656,745 A | * 4/1987 | Griffin | 144/371 |
| 4,899,795 A | * 2/1990 | Hackett | 144/138 |
| 4,972,885 A | * 11/1990 | Legler et al. | 144/1.1 |
| 5,065,802 A | 11/1991 | Peterson | 144/2 R |
| 5,535,652 A | 7/1996 | Beck | 82/118 |
| 5,806,401 A | 9/1998 | Rajala | 83/865 |

FOREIGN PATENT DOCUMENTS

| CA | 200464 | 6/1920 |
|---|---|---|
| CA | 758397 | 5/1967 |
| CA | 1040903 | 10/1978 |
| CA | 1045521 | 1/1979 |

* cited by examiner

*Primary Examiner*—W. Donald Bray
(74) *Attorney, Agent, or Firm*—Mario Theriault

(57) ABSTRACT

The present invention consists of a lathe attachment for installation on a portable bandsaw mill, for turning round shafts from wood blocks on the portable bandsaw mill. The lathe attachment has an elongated chassis, a tailstock and a headstock mounted on opposite ends of the chassis for holding and rotating a wood block along the chassis. Bindings are provided to retain the chassis to the cross beams of the portable bandsaw mill. In another aspect of the invention, a number of symmetrical facets are firstly sawed along the wood block prior to turning the wood block. The turning of a round shaft on the bandsaw mill is preferably effected while the alignment of the wood block or shaft makes an acute angle with the direction of movement of the bandsaw head.

20 Claims, 7 Drawing Sheets

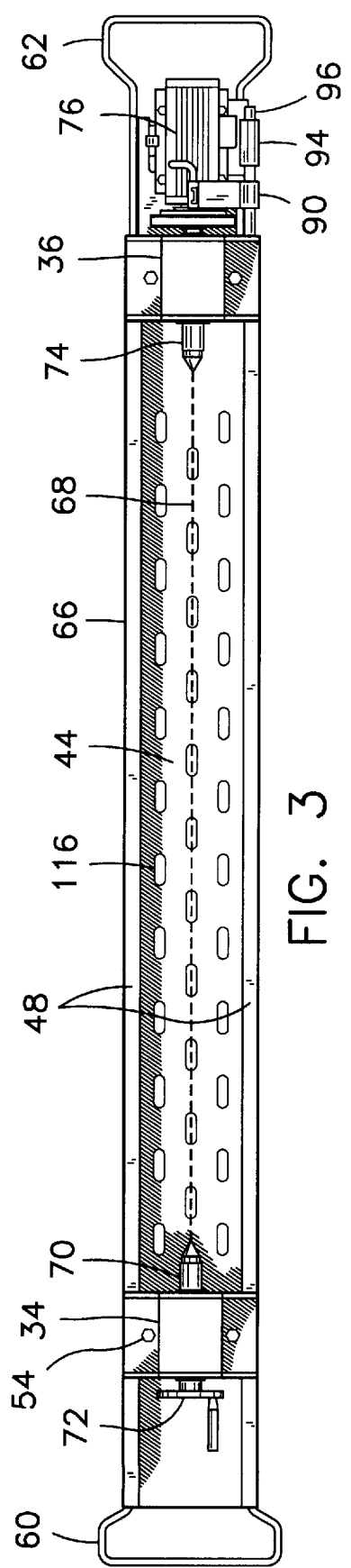
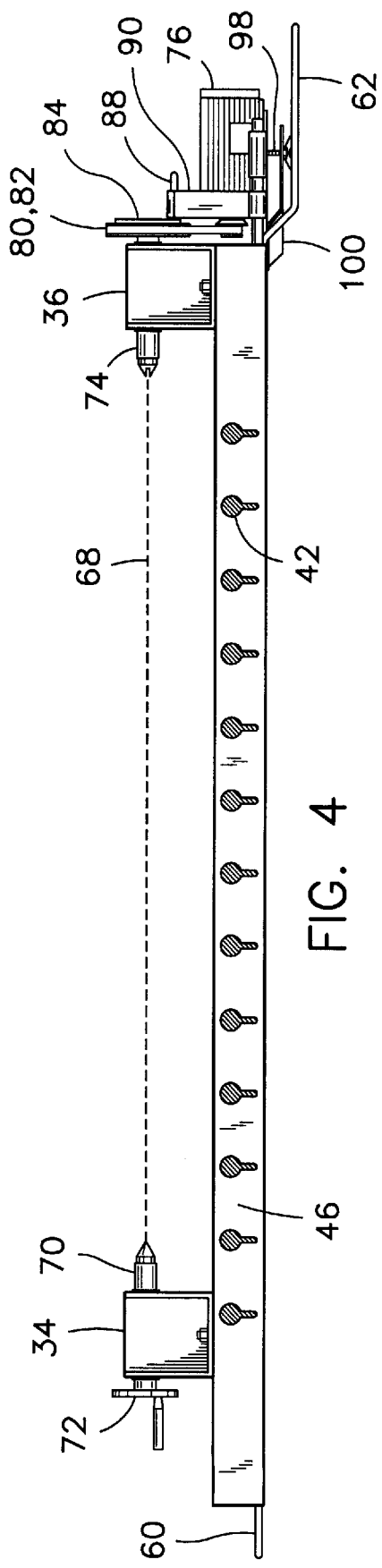
FIG. 3
FIG. 4

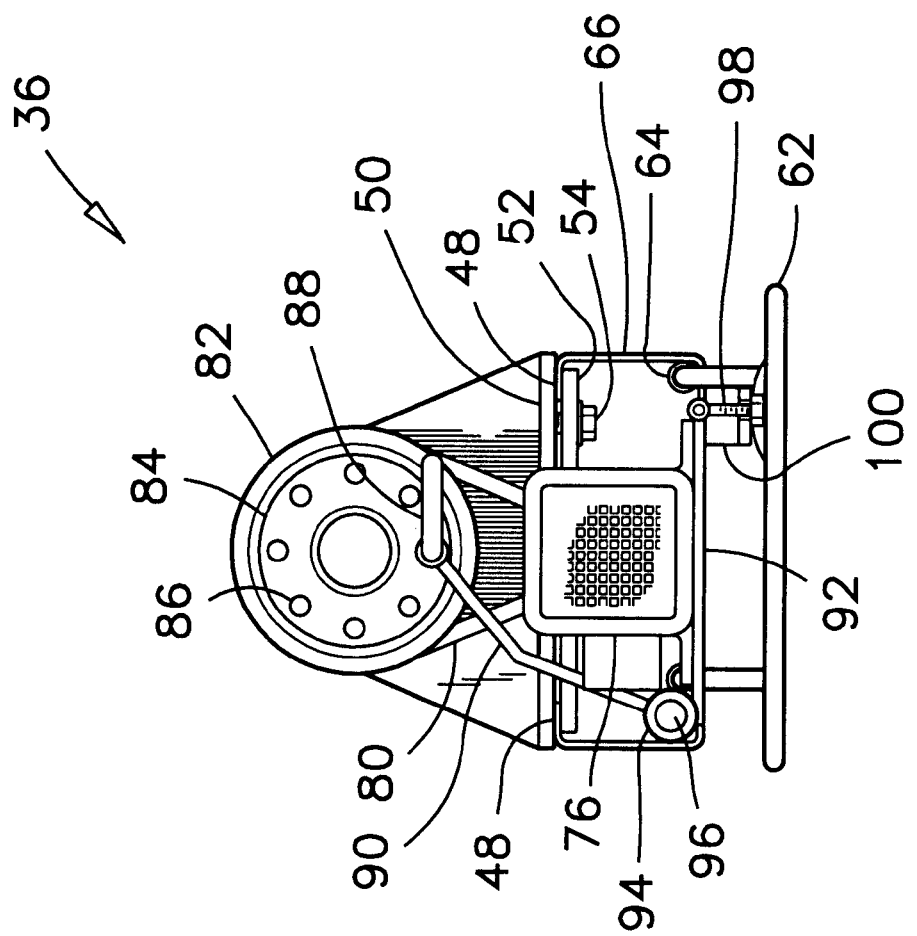
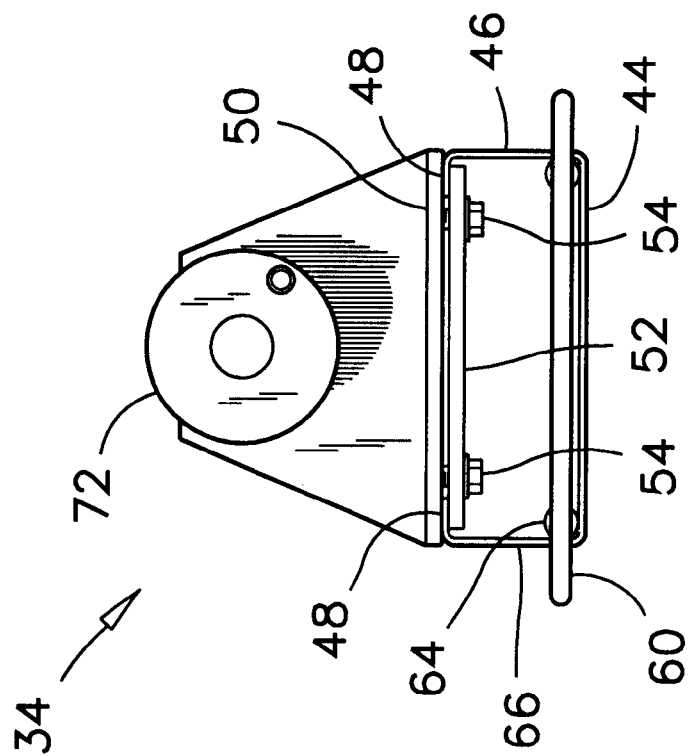
FIG. 6
FIG. 5

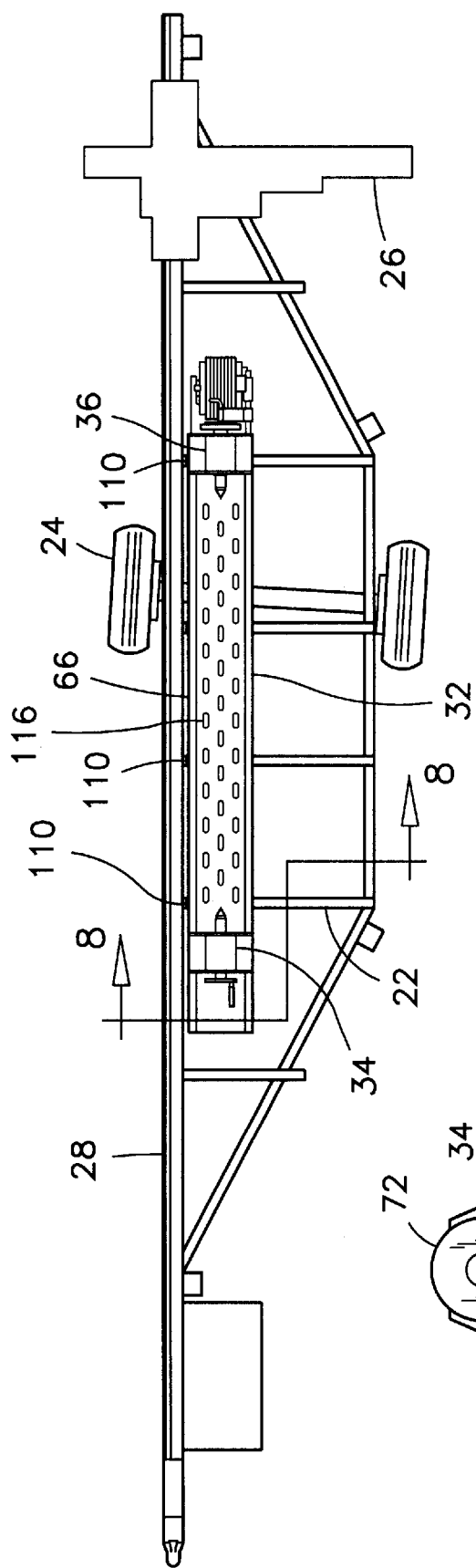
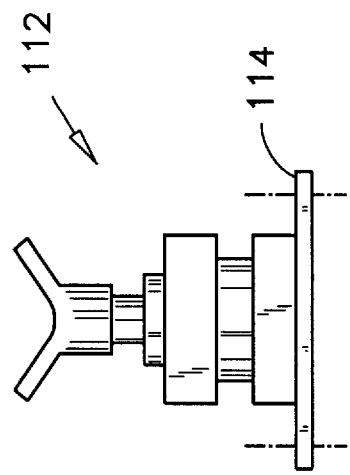
FIG. 9
FIG. 7
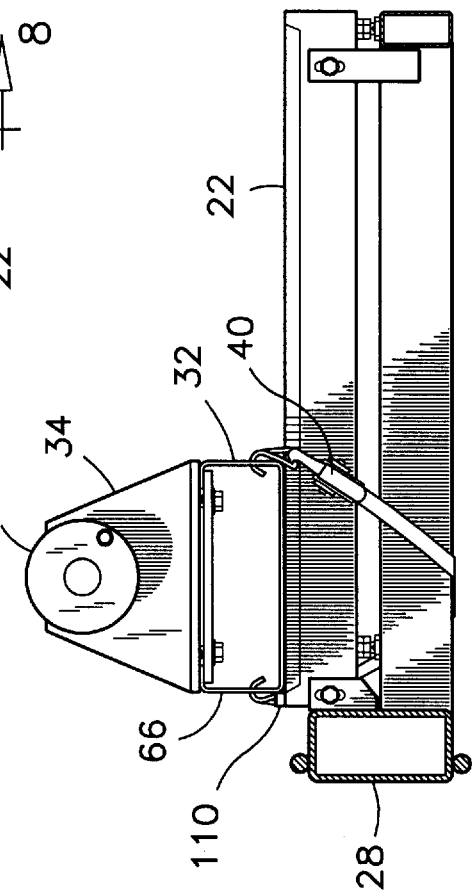
FIG. 8

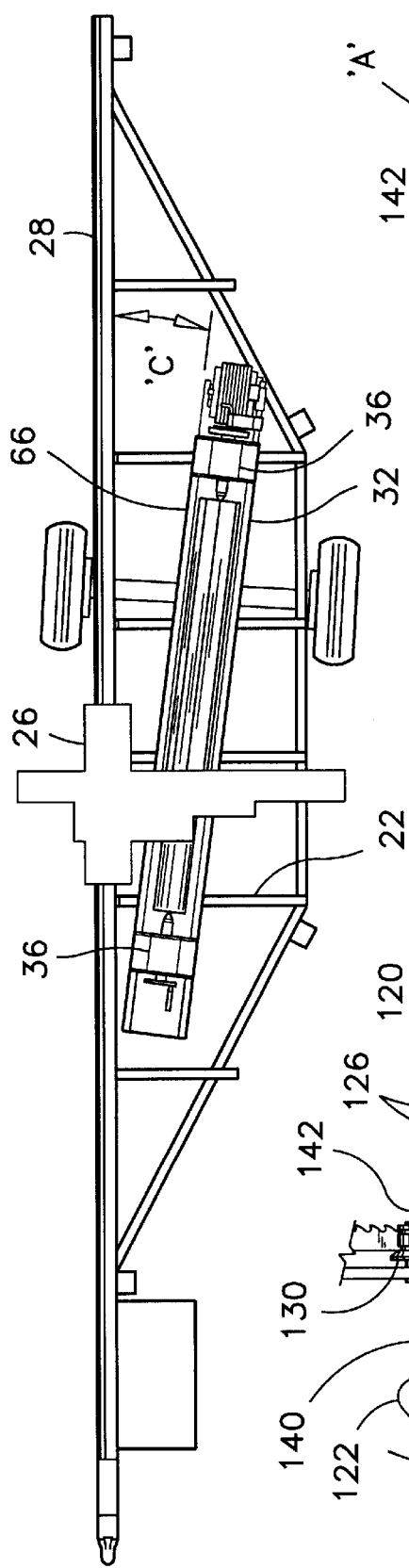
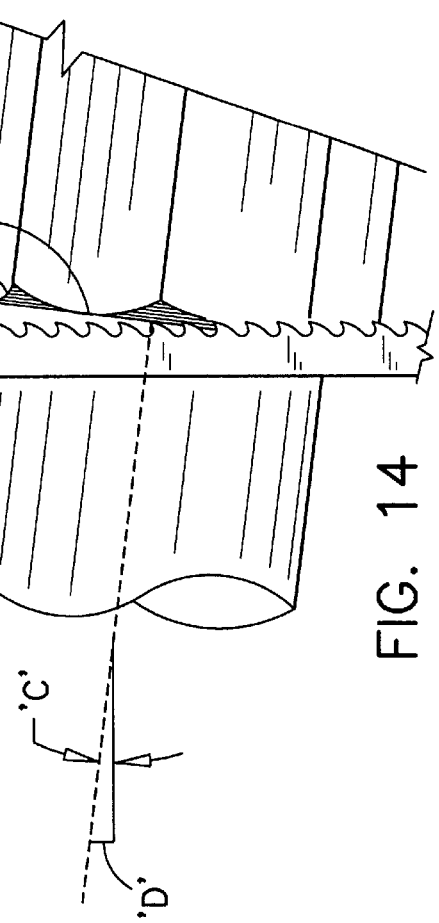
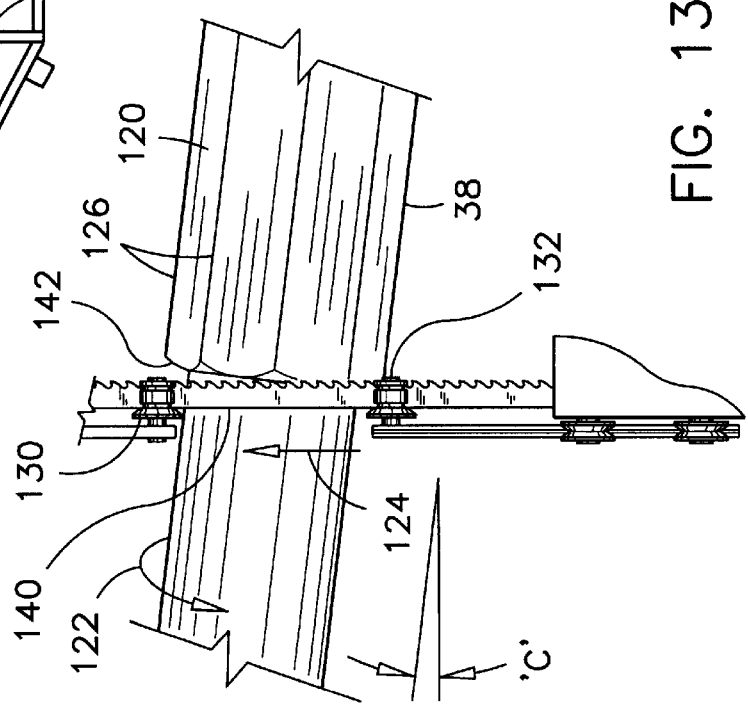
FIG. 12
FIG. 14
FIG. 13

LATHE ATTACHMENT FOR A PORTABLE BANDSAW MILL

FIELD OF THE INVENTION

This invention pertains to wood lathes, and more particularly, it pertains to an apparatus and a method for turning cylindrical posts and rails on a bandsaw mill.

BACKGROUND OF THE INVENTION

Since the late seventies, the use of portable bandsaw mills has known a continuous growth in North America. These machines are convenient for sawing lumber out of a few logs for a private wood lot owner, as well as for sawing several thousand board feet per day at a commercial forest product operation. These machines are transportable on wheels behind a pickup truck between wood lots, or are simply set on blocks at a log yard and left there for readily sawing harvested logs into lumber. The machines are relatively easy to operate and to maintain. The ratio of their production capacities over capital investment is attractive to a contractor. Therefore, these machines have created a new lumber industry, where wood lot owners do not have to transport their logs to distant sawmills.

In such on-site forest product operation, however, it is sometime desirable to manufacture round wood shafts for use as posts, railings, and in building log houses and lawn ornaments, for examples. In the past, it was not possible to manufacture round wood shafts on a bandsaw mill because of a lack of machinery suitable for this purpose.

It is believed that the prior art is short of suggestions with regard to a machine to manufacture round shafts on a bandsaw mill. It is also believed that the prior art is short of suggestion with regard to a method for turning a round shaft using any bandsaw machine. Therefore, the bandsaw mill operators of the past were lacking the means and the incentive to consider the manufacturing of round wood shafts from clients' logs.

As such, it may be appreciated that there continues to be need for a lathe attachment for a bandsaw mill, which can take advantage of the cutting edge of a bandsaw blade and the power advance system of the bandsaw head to produce round shafts on a job site, as easily as the conventional production of lumber.

SUMMARY OF THE INVENTION

In the present invention, there is provided a lathe attachment for installation on a portable bandsaw mill, for turning round shafts on that portable bandsaw mill. The lathe attachment according to the present invention comprises broadly, an elongated chassis, a tailstock and a headstock mounted on opposite ends of the elongated chassis; a live centre and a driven spindle on the tailstock and headstock respectively for holding and rotating a wood block along the elongated chassis. The lathe attachment also comprises bindings for retaining the elongated chassis to the cross beams of a portable bandsaw mill.

The lathe attachment is usable to make round posts, wood columns, logs for log houses, fencing stock, and other round wood products of the like on a portable horizontal bandsaw mill.

In another aspect of the present invention, the lathe attachment comprises an indexing mechanism on the driven spindle, for positioning and holding the driven spindle at various angular positions. This indexing mechanism is advantageous for sawing a number of symmetrical facets along a wood block prior to turning the wood block.

In yet another aspect of the present invention, there is provided a method for turning a round shaft on a bandsaw mill, which consists of:

using a bandsaw blade, sawing a number of symmetrical facets along an elongated wood block at a same diameter on the wood block, such that the facets enclose the circumference of the elongated wood block;

while operating the bandsaw blade in a first direction, rotating the wood block about its longitudinal axis in a second direction opposite the first direction; and moving the bandsaw blade along the wood block, at the mentioned diameter of the wood block for turning the wood block into a round shaft having the mentioned diameter.

In yet another aspect of the present invention, the turning of the round shaft on the bandsaw mill is effected while the alignment of the wood block makes an acute angle with the direction of movement of the bandsaw head. This oblique alignment is advantageous for reducing wobbling of the bandsaw blade during the turning of a round shaft.

Still another feature of this lathe attachment is that it is susceptible of a low cost of manufacture with regard to both materials and labour, and which accordingly is then susceptible of low price of sale to the consumer, thereby making such lathe attachment economically available to the public.

Other advantages and novel features of the present invention will become apparent from the following detailed description.

BRIEF DESCRIPTION OF THE DRAWINGS

One embodiment of this invention is illustrated in the accompanying drawings, in which like numerals denote like parts throughout the several views, and in which:

FIG. 3 is the top view of the lathe attachment;

FIG. 4 is a side view of the lathe attachment;

FIG. 5 is the end view of the tailstock of the lathe attachment;

FIG. 6 is the end view of the headstock of the lathe attachment;

FIG. 7 is the top view of the portable bandsaw mill with the lathe attachment mounted thereon;

FIG. 8 is a cross-section view of the portable bandsaw mill with the lathe attachment mounted thereon, as seen along line 8—8 in FIG. 7;

FIG. 9 is a wood block centring jack which can be optionally used with the lathe attachment for centring a wood block on the lathe attachment;

FIG. 12 is a second top view of the portable bandsaw mill with a lathe attachment mounted thereon in an oblique alignment relative to the direction of movement of the bandsaw head;

FIG. 13 is a partial top view of the bandsaw blade working a wood block in the oblique alignment;

FIG. 14 is an enlarged partial top view of a wood block in the oblique alignment, showing reference angles and dimensions.

DETAILED DESCRIPTION OF THE PREFERRED EMBODIMENT

Figure 1:
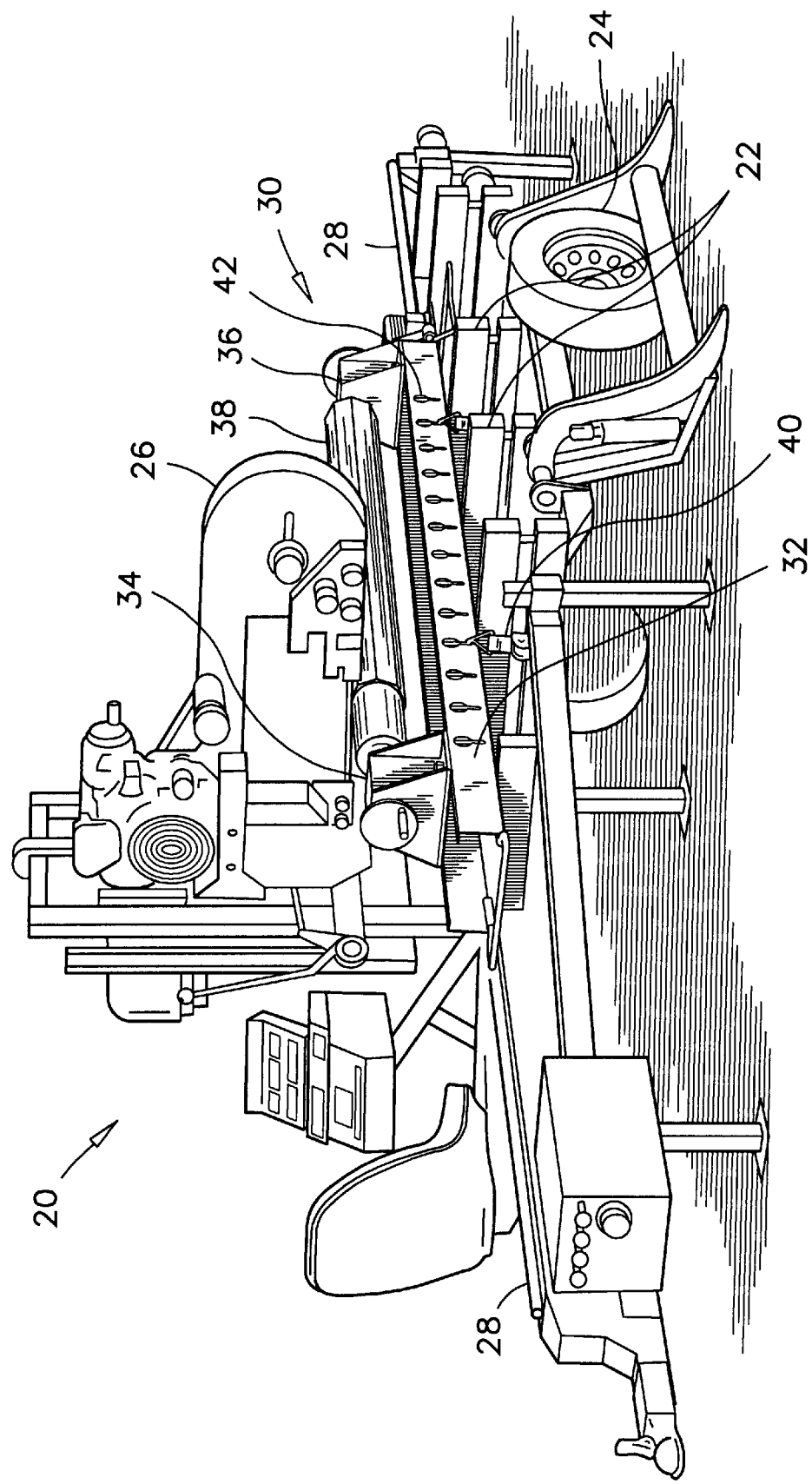
FIG. 1 is a perspective view of a portable bandsaw mill with a lathe attachment according to the preferred embodiment mounted thereon.
Figure 2:
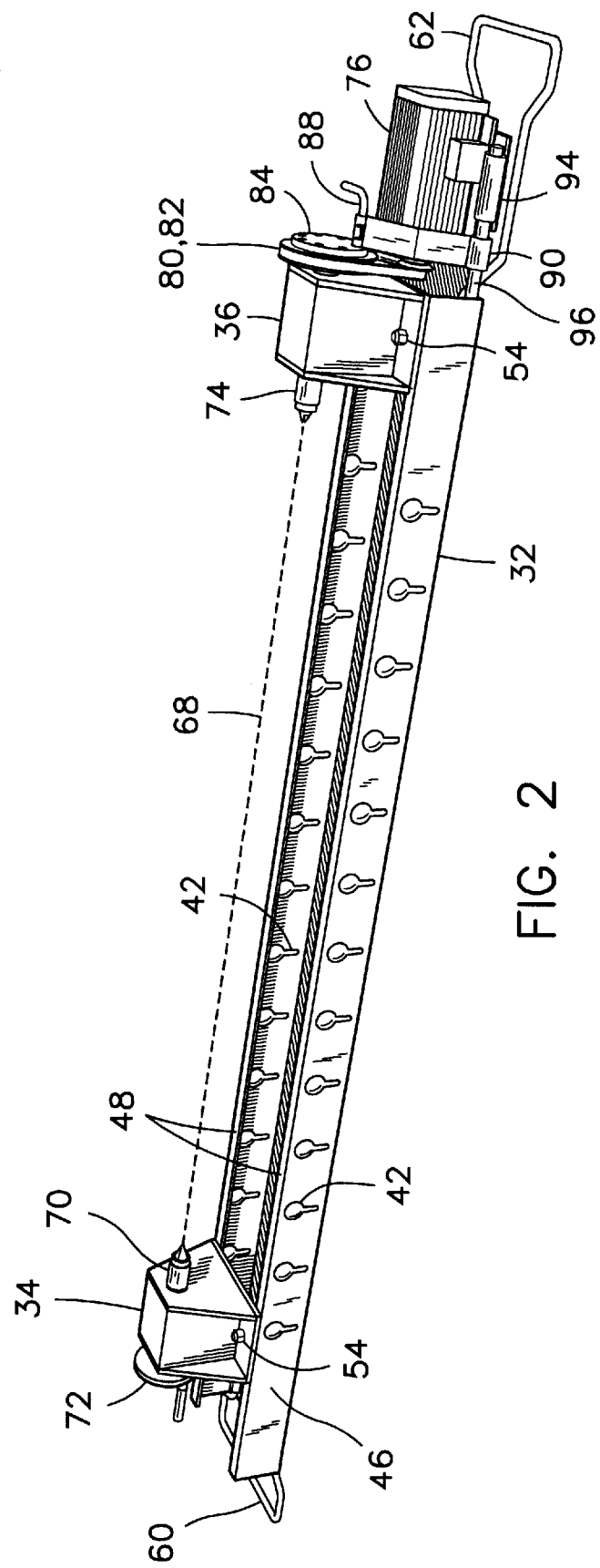
FIG. 2 is a perspective view of the lathe attachment.

While this invention is susceptible of embodiments in many different forms, there is shown in the drawings and will be described in details herein one specific embodiment, with the understanding that the present disclosure is to be considered as an example of the principles of the invention and is not intended to limit the invention to the embodiment illustrated.

Referring firstly to FIG. 1 the portable bandsaw mill 20 referred to herein is the type of machine having a bed made of cross beams 22 for supporting a log, and which is movable on wheels 24. The bandsaw mill has a horizontally bandsaw head 26 movable along one or two rail beams 28 extending along the bed. This type of portable bandsaw mill is manufactured in different configurations and sold under different brand names. Although the drawings illustrate a portable bandsaw mill having a single rail beam 28, it is not the intent of the present disclosure to limit the invention to a mounting on this type of machine. As will be understood, the lathe attachment according to the present invention is mountable on various models of portable horizontal bandsaw mills.

The lathe attachment 30 according to the preferred embodiment comprises broadly, a chassis 32 supporting a tailstock 34 on one end thereof and a headstock 36 on the other end. As seen in FIG. 1, a wood block 38 is mountable and rotatable between the tailstock 34 and the headstock 36.

The chassis 32 of lathe attachment 30 is preferably held to the cross beams 22 of the bandsaw mill 20 by two or more strap and puller assemblies 40, known in the lumber transport industry as "ratchet style load huggers". The lathe attachment 20 is thereby easily mounted or removed from the cross beams 22 of the bandsaw mill 20. The chassis 32 has a plurality of anchor keyholes 42 there-along, on both sides thereof to accommodate the installation of bindings such as the strap and puller assemblies 40 at various locations along the chassis. These keyholes 42 are advantageous for offering the ability to secure the lathe attachment 30 to various types and spacings of cross beams on various bandsaw mills.

The use of strap and puller assemblies 40 is also advantageous for easily retaining the chassis 32 to the cross beams 22, with one end of the chassis elevated relative to the other, when turning a taper round shaft for example.

Referring now to FIGS. 2–6, the preferred lathe attachment will be described in details. Firstly, the chassis 32 is made of sheet metal formed into a trough-like cross-section having a flat bottom 44, two sides 46 having the keyholes 42 therein, and flanges 48 being respectively contiguous to and extending along each side 46.

The tailstock 34 and the headstock 36, have a respective base 50 extending across the chassis 32 and a clamp bar 52 affixed to the base with bolts 54 and enclosing the flanges 48 of the chassis against the base 50. The tailstock 34 and the headstock 36 are held to the chassis 32 by the pressure of the clamp bars 52 against the flanges 48 and the respective base 50. The tailstock 34 and the headstock 36 are movable along the chassis 32 to accommodate various lengths of wood blocks, by working the bolts 54.

Two handles 60, 62 are provided, one at each end of the chassis 32 to manipulate the lathe attachment with ease. The handles 60, 62 are made of round metal bar, and are removably mounted into sockets 64 at the ends of the chassis 32. In use, one or both handles 60, 62 can be removed to allow a mounting of the lathe attachment 30 along and close to the rail beam 28 of the bandsaw mill.

The chassis 32 of the lathe attachment has a straight edge 66 there along, as seen in FIG. 3 in particular, which extends parallel with the turning or working axis 68 of the lathe attachment.

The tailstock 34 has a live centre 70 which is also adjustable along the turning axis 68, by means of a handle wheel 72 and feed screw mechanism or otherwise. The headstock 36 has a driven spindle 74, linked to a motor 76. The driven spindle 74 has a notch or other grabbing means thereon to grab and apply torque to the end of a wood block, as is customary with wood lathes.

The motor 76 of the headstock is preferably operable at various speeds by a variable speed controller (not shown). The motor 76 may also consists of a stepper or servo motor capable of indexing a wood block precisely around the rotation axis 68.

The motor 76 is selected such that it has sufficient working torque to rotate a 16 inch diameter wood block, by 10 feet long, at variable speeds of up to about 1500 RPM. When a servo or stepper motor is used, it should have sufficient holding torque to position the wood block precisely at various degrees around its circumference. The stepper or servo motor 76 is preferably controlled by a programmable controller (not shown) and a console (not shown) operable by the operator of the bandsaw mill.

In the preferred embodiment, the motor 76 operates the driven spindle 74 by means of a belt 80 and sheaves. The driven sheave 82 has a protractor plate 84 affixed to it. The protractor plate 84 has index holes 86 therein equally spaced apart. An index pin 88 is removably inserted into one of the index holes 86 to selectively retain the driven spindle 74 and a wood block in a fixed position around the turning axis 68. The index pin 88 is movably mounted in a holder 90 which is fixed to the chassis 32, and which comprises a locking mechanism for holding the index pin 88 in a retracted position when rotating the driven spindle 74 continuously.

It will be appreciated that when a stepper or servo motor is used, the protractor plate 84 and the index pin 88 may not be required.

The motor 76 is mounted on a base plate 92, which is affixed to a longitudinal sleeve 94 movably mounted on a stub shaft 96. The stub shaft 96 extends from the chassis 32. The base plate 92 is movable about the stub shaft 96, for tightening or slackening the drive belt 80. For this purpose, a screw and wing nut arrangement 98 is used to pull the base plate 92 against a rigid bracket 100 affixed to the chassis 32.

In the preferred embodiment, the index pin holder 90 is also mounted on the stub shaft 96 and is keyed to or otherwise retained fixed to the stub shaft 96.

Referring now to FIGS. 7 and 8, the chassis 32 of the lathe attachment 30 can be set straight along the rail beam 28 of the bandsaw mill by placing the straight edge 66 of the chassis 32 against the lumber edge stoppers 110 normally found on the cross beams 22 of a bandsaw mill. Such alignment is advantageous for turning a wood block with the turning axis 68 of the lathe attachment set parallel to the rail beam 28, when turning a taper shaft for example.

A pair of centring jacks 112 are preferably used to position a large wood block between the live centre 70 and the driven spindle 74. The centring jack 112 has a base plate 114 which can be affixed to slots 116 in the bottom surface 44 of the chassis 32.

Figure 11:
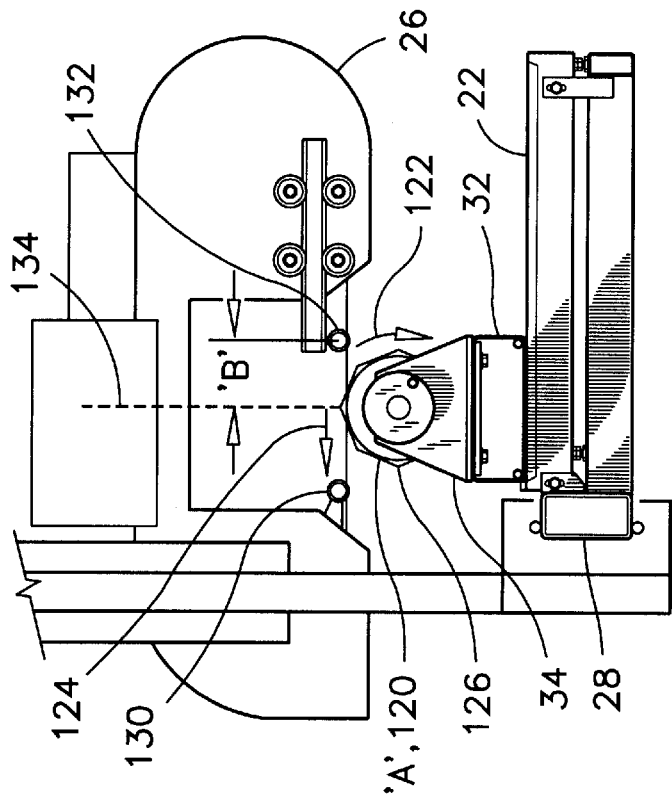
FIG. 11 is a cross-section view of the portable bandsaw mill as seen along line 11—11 in FIG. 10.
Figure 10:
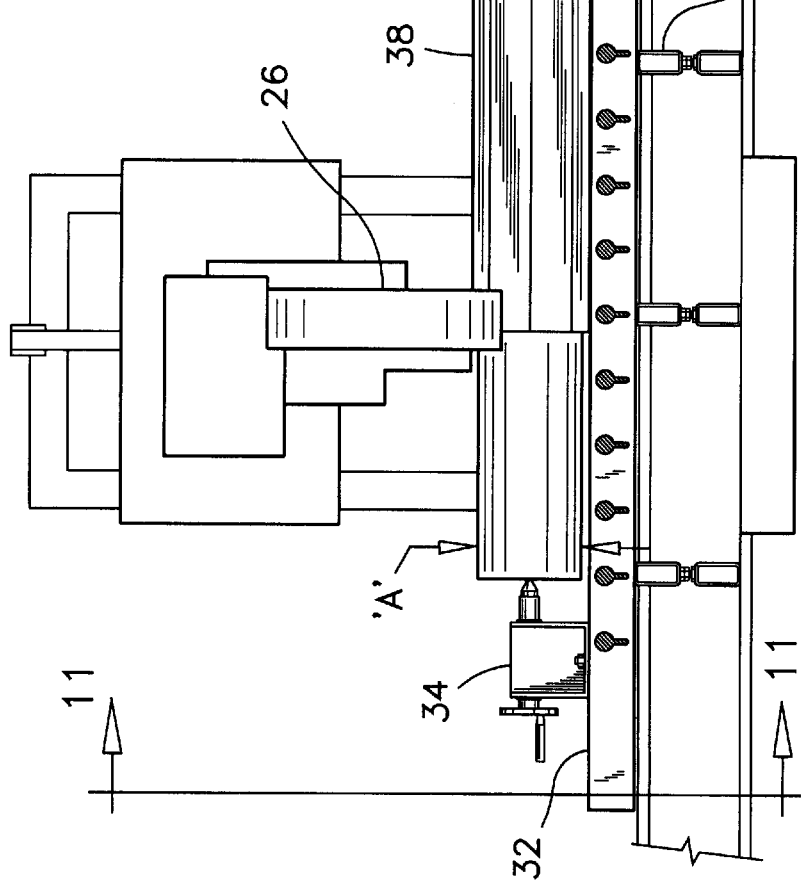
FIG. 10 is a partial side view of the portable bandsaw mill and a round shaft being turned on the lathe attachment.

Referring now to FIGS. 10 and 11, the operation of the lathe attachment will be described. The first step in a method for turning a wood block 38 consists of sawing six or more facets and preferably eight facets 120 along the length of the wood block 38. This is done by sequentially rotating and positioning the wood block 38 by the aid of the stepper or servo motor 76 or using the protractor plate 84 and the index pin 88, a selected numbers of degrees and by taking a longitudinal cut at each position. The diameter 'A' of the wood block across opposite facets 120 should be about the final diameter of the round shaft after turning.

The next step consists of rotating the wood block 38 at a constant speed and advancing the bandsaw blade along the surface of the wood block, at the final diameter 'A' mentioned before. During this operation, as illustrated in FIG. 10, the wood block is rotated in a direction opposite the movement of the saw blade, as indicated by arrows 122 and 124 respectively in FIG. 11. During this step, the raised edges 126 between the facets 120 are sawed off and the block is turned perfectly round.

During this last step, the rotational speed of the wood block, the diameter of the block, the linear speed and the advance of the saw blade and the number of facets are variables which may affect to a certain degree the quality of the turned round shafts or the performance of the turning operation. Therefore, these parameters must be adjusted to a particular machine and to the wood block condition.

It is also recommended that during the turning of a wood block, each of the blade support rollers 130, 132 of the bandsaw head 26, should be adjusted at a distance 'B' of at least about three inches to about six inches from a vertical plane 134 extending from the tuning axis 68. In that respect, it has been found that this minimum spacing 'B' provides for an excellent performance and excellent surface quality, when a common band saw blade of 1¼ inch is used. The positioning of the rollers at the specified minimum distance 'B' contributes to a great extent to preventing the bandsaw blade from wobbling during the turning of a round shaft.

Referring now to FIGS. 12–14, there is illustrated therein another step in a method for turning a wood block while generating minimum vibration and wobbling in the bandsaw blade. It has been found that a smoother operation of the lathe attachment has been obtained by placing the lathe attachment 30 at an angle 'C' from the rail beam 28 of the bandsaw mill 20. The angle 'C' can vary from one bandsaw mill to the other. However, the maximum oblique alignment is determined by the throat gap, or the maximum spacing between supports rolls 130 and 132, of the bandsaw head. It has been found that an oblique alignment of between about 3° and 12° is possible and has given the smoothest operation and a superior surface finish on the round shafts, as compared to an alignment parallel to the rail beam 28.

It will be appreciated that when a faceted wood block is sawed while being rotated in an oblique alignment, the saw blade 140 cuts a chamfer 142 at every raised edge 126 between adjacent facets 120. The raised edges 126 are thereby worked in a top-down direction relative to the diameter 'A', as opposed to a straight tangential cut, as it is the case when the turning axis 68 is set parallel with the rail beam 28. It should also be appreciated that during the turning of a round shaft in an oblique alignment, the length of the bandsaw blade 140 which is in contact with the wood block 38 extends over a distance 'D' which corresponds to the sinus of the angle 'C', relative to the blade width. Thirdly, such oblique alignment causes the raised edges 126 of the wood block to enter into the cutting edge of the saw blade as opposed to rubbing against it at right angle as in the case of a straight tangential cut.

The length 'D' of blade in contact with the wood block and the working of the raised edges 126 in a top-down direction have been found to be advantageous for preventing vibration in the saw blade and for producing good surface finish on the manufactured round shafts. It has been found that even a slight oblique angle 'C' eliminates the bandsaw wobbling problems experienced with a straight tangential cut.

As to other manner of usage and operation of the lathe attachment, the same should be apparent from the above description and accompanying drawings, and accordingly no further discussion relative to these aspects would be considered redundant and is not provided.

While one embodiment of the lathe attachment has been illustrated in the accompanying drawings and described hereinabove, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A lathe attachment for installation on a portable bandsaw mill, for turning round shafts on said portable bandsaw mill, said lathe attachment comprising:

an elongated chassis;

a tailstock and a headstock mounted on opposite ends of said elongated chassis and having means for holding and rotating a wood block along said elongated chassis, and means for retaining said elongated chassis to the cross beams of a portable bandsaw mill;

such that a wood block is workable into a round shaft using said portable bandsaw mill.

2. The lathe attachment as claimed in claim 1, wherein said elongated chassis has a trough-like cross-section, a bottom surface, and sides having a series of holes therein for receiving said means for retaining said elongated chassis to the cross beams of a portable bandsaw mill.

3. The lathe attachment as claimed in claim 2, wherein said means for retaining said elongated chassis to the cross beams of a portable bandsaw mill comprise a strap and puller assembly.

4. The lathe attachment as claimed in claim 2 wherein said elongated chassis further has flanges contiguous to said sides, and each of said headstock and said tailstock has a base and a clamp bar retained to said base with bolts and enclosing said flanges against said base.

5. The lathe attachment as claimed in claim 1, wherein said headstock has a driven spindle, a motor, and a sheave and belt assembly between said driven spindle and said motor.

6. The lathe attachment as claimed in claim 5 wherein said driven spindle further comprises an indexing mechanism for positioning and holding said driven spindle at various angular positions.

7. The lathe attachment as claimed in claim 6, wherein said indexing mechanism comprises a protractor plate mounted to said driven spindle and an index pin mounted to said chassis.

8. The lathe attachment as claimed in claim 5, wherein said motor is a stepper motor.

9. The lathe attachment as claimed in claim 1, wherein said tailstock has a live centre and an advance mechanism on said live centre.

10. The lathe attachment as claimed in claim 2, wherein said bottom surface has a plurality of holes therein for retaining a wood block centring jack.

11. In combination, a portable bandsaw mill and a lathe attachment mounted on said portable bandsaw mill, said portable bandsaw mill comprising a longitudinal bed, a horizontal bandsaw head movably mounted to said bed for movement along said bed, and a plurality of spaced-apart cross beams extending across said bed;

said lathe attachment comprising a longitudinal chassis, a tailstock and a headstock mounted on opposite ends of said chassis, and means for holding and rotating a wood block along said chassis, and means for retaining said lathe attachment to said cross beams of said bandsaw mill;

such that round shafts are manufacturable on said lathe attachment and said bandsaw mill.

12. The combination as claimed in claim 11, wherein said horizontal bandsaw head comprises a pair of spaced-apart support rollers along a bandsaw blade thereof.

13. The combination as claimed in claim 12, wherein said lathe attachment has a turning axis, and said support rollers are spaced at a minimum distance of about three inches from a vertical plane extending from said turning axis, on each sides of said turning axis.

14. The combination as claimed in claim 11, wherein said longitudinal bed has a rail beam for guiding a direction of movement of said horizontal bandsaw head and said lathe attachment has a turning axis aligned at an acute angle from said rail beam.

15. The combination as claimed in claim 14, wherein said acute angle is between about 3 degrees and about 12 degrees.

16. A method for turning a round shaft on a bandsaw mill, comprising the steps of:

using a bandsaw blade, sawing a number of symmetrical facets along an elongated wood block at a same diameter on said elongated wood block, and enclosing a circumference of said elongated wood block with said symmetrical facets;

while operating said bandsaw blade in a first direction, rotating said elongated wood block about a longitudinal axis thereof in a second direction opposite said first direction; and moving said bandsaw blade along said elongated wood block, at said diameter on said elongated wood block for turning said elongated wood block into a round shaft having said diameter.

17. The method as claimed in claim 16, wherein said step of sawing a number of symmetrical facets comprises the step of sawing a number of flat facets separated from each other by a raised edge relative to said diameter.

18. The method as claimed in claim 17, further comprising the step of sawing a chamfer on each of said raised edges.

19. The method as claimed in claim 18, wherein said second direction makes an acute angle with said first direction.

20. The method as claimed in claim 19, wherein said acute angle is at least between about 3 degree and about 12 degree.

* * * * *